UNITED STATES PATENT OFFICE.

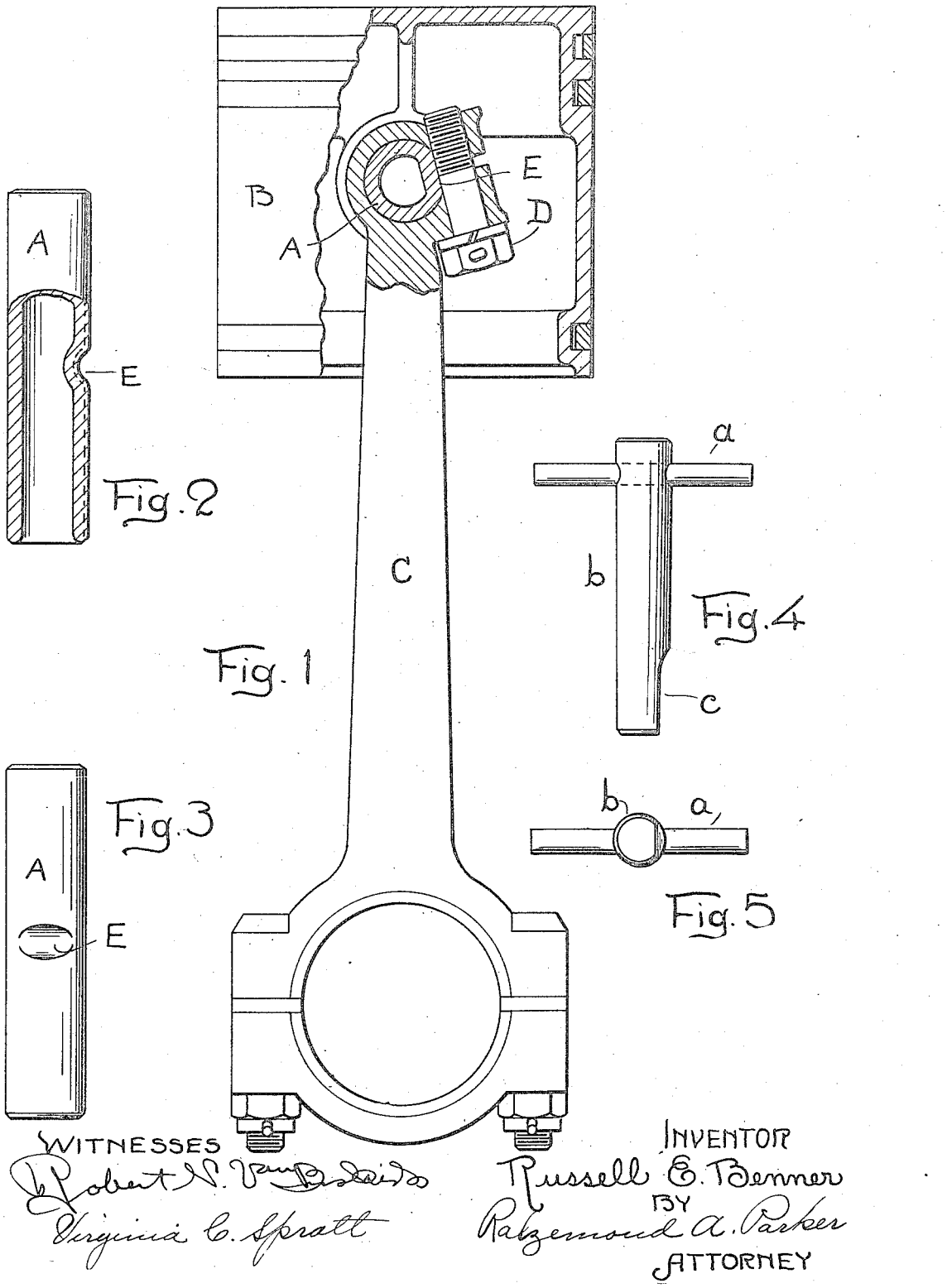

RUSSELL E. BENNER, OF DETROIT, MICHIGAN.

WRIST-PIN.

1,197,333.

Specification of Letters Patent.

Patented Sept. 5, 1916.

Application filed December 7, 1914. Serial No. 875,753.

*To all whom it may concern:*

Be it known that I, RUSSELL E. BENNER, a citizen of the United States, residing at Detroit, county of Wayne, State of Michigan, have invented a certain new and useful Improvement in Wrist-Pins; and declare the following to be a full, clear, and exact description of the same, such as will enable others skilled in the art to which it pertains to make and use the same, reference being had to the accompanying drawings, which form a part of this specification.

This invention relates to tubular wrist pins having a transverse groove for the reception of the fastening bolt, and the method of constructing the same. When this groove is made by cutting away the metal of the pin, the wall between the groove and the inner periphery of the pin is rendered thin, and when the pin is hardened so that the material is not homogeneous this thin portion is differently effected than the rest of the pin and the pin is liable to break.

My invention consists in making the groove by pressing inward the wall so as to produce at the same time a corresponding projection on the inside of the pin. This makes the wall everywhere of substantially uniform thickness, and insures the homogeneity of the finished pin. This construction also produces a pin that may be easily manipulated for grinding.

In the accompanying drawings: Figure 1, shows an engine piston with its connecting rod pivoted in place by means of my improved wrist pin, said pin, the end of the connecting rod adjacent thereto, and a portion of said piston being shown in section. Fig. 2, shows the wrist pin separately, a part being broken away to exhibit the transverse groove in longitudinal section. Fig. 3, is a top view of the wrist pin, showing the transverse groove. Figs. 4 and 5, respectively, are side and end views of a tool for holding and adjusting the pin for grinding.

The wrist pin A is of steel and in the usual tubular form. It connects the piston B and the connecting rod C in the usual way, being seated at its ends in bearings in the piston and passing through the opening in the connecting rod, in which it is clamped by means of the bolt D, said bolt being received in the groove E formed transversely in said pin.

As hitherto constructed, the wall of the pin has been of uniform thickness, and the groove E has been produced by milling or otherwise cutting away the metal of said wall. The thickness of the wall between the bottom of the groove and the inner surface of the pin is thus greatly reduced. When the pin is surface hardened, the hardening extends inwardly for a certain distance, and follows the contour of the surface, so that it affects practically all that portion of the wall which is of reduced thickness, as above noted, rendering the same brittle, and because of its thinness liable to rupture. In order to avoid this difficulty, I produce the groove E by pressing the wall inwardly so as not merely to form the groove E on the outer surface of the pin, but also a corresponding projection F on the inner surface. In this way I keep the thickness of the wall substantially uniform everywhere. Hence the hardened outer portion, the depth of which is indicated by the dotted line in Fig. 2, is backed by the tough unhardened metal between the groove and inner periphery of the pin, and the wall is as strong at this point as at other points.

To turn the pin a tool shown in Figs. 4 and 5 is employed. This tool resembles a socket wrench and is provided with the handle *a* and a cylindrical shank *b*, the latter being cut away at *c*. The shank *b* fits in the tube of which the pin is made, the cut away portion *c* engaging the portion of the wall that is bent inward. The center of the grinder may be formed like the shank *b*.

What I claim is:

1. A tubular steel wrist pin having an indentation in its exterior surface and a corresponding projection from its interior surface, the wall of said pin being of substantially uniform thickness, said pin being hardened for the purpose described.

2. A tubular steel wrist pin having on its exterior a transverse groove and on its interior a projection corresponding thereto, the wall of said pin being of substantially uniform thickness, said pin being hardened for the purpose described.

3. A tubular steel wrist pin having on its exterior a transverse groove and on its interior a projection corresponding thereto, the said groove and projection being simultaneously formed by inwardly pressing the wall of said pin, said pin being hardened for the purpose described.

4. The method of making a wrist pin consisting in taking a cylindrical tubular piece of steel and pressing the wall thereof inward to produce a transverse groove in its periphery and then hardening the steel.

5. The method of making a wrist pin, consisting in taking a cylindrical tubular piece of steel and pressing the wall thereof inward at one place so as to form a depression in the surface and leave the shell of the wrist pin of uniform thickness and then hardening the pin.

In testimony whereof, I sign this specification in the presence of two witnesses.

RUSSELL E. BENNER.

Witnesses:
AGNES M. HIPKINS,
ELLIOTT J. STODDARD.